(12) United States Patent
Schlitzkus et al.

(10) Patent No.: US 7,240,696 B2
(45) Date of Patent: Jul. 10, 2007

(54) DEVICE FOR DAMPING PRESSURE PULSATIONS

(75) Inventors: Michael Schlitzkus, Dietmannsried (DE); Andreas Weh, Durach (DE); Peter Roth, Immenstadt (DE); Bernd Lutz, Kempten (DE); Sabine Ertl, Immenstadt (DE); Tomoya Ideguchi, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 514 days.

(21) Appl. No.: 10/765,174

(22) Filed: Jan. 28, 2004

(65) Prior Publication Data

US 2004/0217559 A1 Nov. 4, 2004

(30) Foreign Application Priority Data

Feb. 10, 2003 (DE) ................. 103 05 310

(51) Int. Cl.
*F16L 55/04* (2006.01)
(52) U.S. Cl. .......................... 138/30; 138/26
(58) Field of Classification Search ................. 138/30, 138/31, 26
See application file for complete search history.

(56) References Cited

U.S. PATENT DOCUMENTS

| | | | | | |
|---|---|---|---|---|---|
| 2,731,038 | A | * | 1/1956 | Purcell ........................ | 138/30 |
| 2,904,077 | A | * | 9/1959 | Trumper ....................... | 138/30 |
| 4,068,684 | A | * | 1/1978 | Greer ........................... | 138/30 |
| 4,136,714 | A | * | 1/1979 | Jones ........................... | 138/30 |
| 4,386,627 | A | * | 6/1983 | Lachaux ....................... | 138/30 |
| 4,526,205 | A | * | 7/1985 | Sugimura et al. ............. | 138/30 |
| 6,478,051 | B1 | * | 11/2002 | Drumm et al. ............... | 138/30 |
| 6,484,756 | B1 | * | 11/2002 | Weber .......................... | 138/30 |
| 6,651,698 | B1 | * | 11/2003 | Wilkes ......................... | 138/30 |
| 6,845,793 | B2 | * | 1/2005 | Ruffer et al. .................. | 141/7 |
| 6,988,514 | B2 | * | 1/2006 | Weber .......................... | 138/30 |
| 2003/0136453 | A1 | * | 7/2003 | Johnson ....................... | 138/30 |

FOREIGN PATENT DOCUMENTS

| | | |
|---|---|---|
| DE | 41 11 201 | 10/1992 |
| DE | 42 34 013 | 4/1994 |
| DE | 100 16 895 | 10/2001 |

* cited by examiner

*Primary Examiner*—Patrick F. Brinson
(74) *Attorney, Agent, or Firm*—Ronald E. Greigg

(57) ABSTRACT

A device for damping pressure pulsations, in electronically regulatable vehicle brake systems for damping the pressure pulsations that are caused by pressure generators in a hydraulic circuit connected to it. The device has a housing which encloses a damping chamber and also has at least one hydraulic connection opening into the damping chamber, and a throttle device. The housing and throttle device are embodied as a compact damping unit that can be preassembled, is economical, and can be anchored in only a few work steps to the hydraulic block of an electronically regulatable vehicle brake system.

13 Claims, 4 Drawing Sheets

DEVICE FOR DAMPING PRESSURE PULSATIONS

BACKGROUND OF THE INVENTION

1. Field of the Invention

The invention is directed to an improved device for damping pressure pulsations in vehicle brake systems to reduce unwanted operating noises which arise because piston pumps used in such systems are compelled to execute reciprocating motions by a rotationally driven eccentric element. Because of these reciprocating motions, pressure fluid is pumped cyclically, which can cause pressure pulsations in the attached hydraulic circuit. These pressure pulsations are audible in the passenger compartment of a vehicle and reduce passenger comfort.

2. Description of the Prior Art

A device for damping pressure pulsations in brake system is already known for instance from German Patent Disclosure DE 4234013 A1. FIG. 3 of this reference shows a hydraulic block of an electronically controllable vehicle brake system, with a receiving bore which forms the housing of the device. The receiving bore is closed off from its surroundings by a cap anchored by positive engagement, and in its interior it defines a damping chamber. An inflow conduit from a pressure generator element discharges into the damping chamber and an outflow conduit leads away from it. There is a throttle at the outlet point where the outflow conduit leads away.

It is a disadvantage of the construction of this known noise-damping device that the cap and the throttle are each individual components, which must be anchored to the hydraulic block in a plurality of successive work steps. The reliable fixation of these individual components must be checked in the course of assembly, and the tightness with respect to pressure fluid from the outside must be assured. These work steps make it complicated and expensive to produce the device.

OBJECT AND SUMMARY OF THE INVENTION

A device according to the invention has the advantage over this prior art that it is embodied such that it can be preassembled externally; that is, its assembly and checking for its tightness and function can be done separately from the assembly of the hydraulic block. The structural unit can then be secured to the hydraulic block in just a few work steps that are known per se; it is itself comparatively compact, and only little free space for the engagement of anchoring tools is required on the hydraulic block.

Various characteristics and embodiments of the housing are disclosed, and the housing can be produced especially simply and hence especially economically as a result of these characteristics. According to one feature, it is attained that pressure increases in the interior of the basic damping device beyond an amount that is tolerable in terms of the mechanical strength of the structural unit are avoided. Such pressure increases could otherwise come about from plugging up of the throttle bore with dirt and/or a temperature-caused increase in viscosity of the pressure medium and over the long term would damage the pump elements that are present in vehicle brake systems, or the drive unit comprising an electric motor and eccentric that act on the pump elements. A filter that is especially favorable in terms of cost is disclosed. The structural volume of the damping device can be limited and hence an especially compact design can be achieved.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
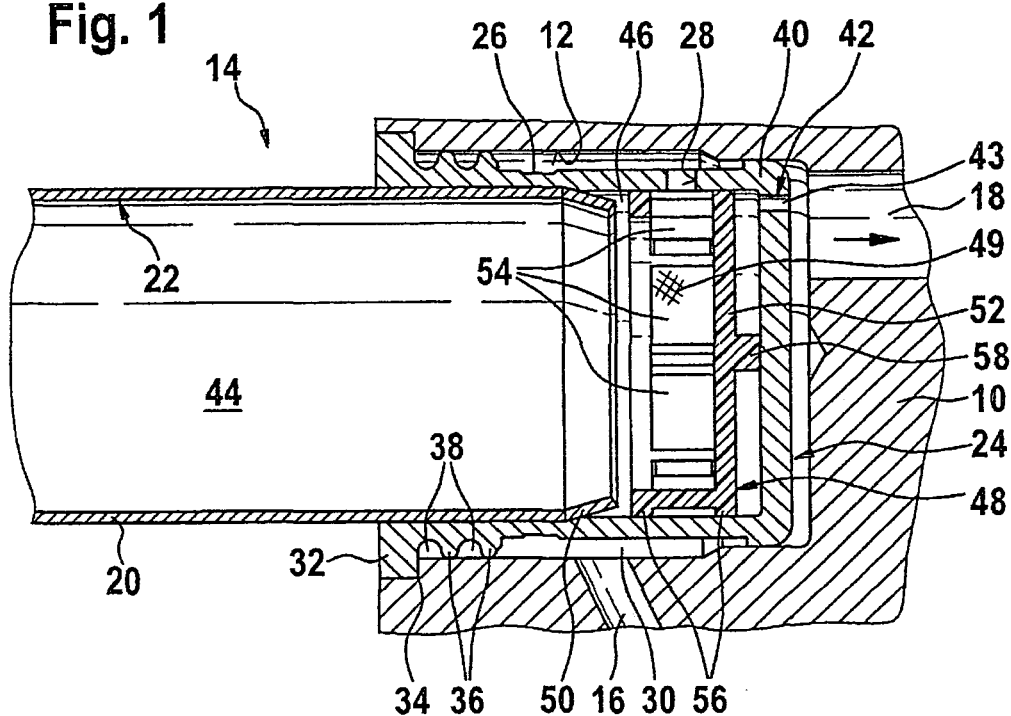
FIG. 1, in longitudinal section, shows a first embodiment of a device according to the invention, inserted into a receptacle of a hydraulic block of an electronically regulatable vehicle brake system.

The reference numerals used in the ensuing description for components corresponding to one another are used uniformly throughout the drawings. FIG. 1 shows a fragmentary view of a hydraulic block 10 of an electronically regulatable vehicle brake system, with a receptacle 12 into which a damping unit 14, which according to the invention is preassembled, is inserted. To that end, the receptacle 12 is embodied in the form of a blind bore and is stepped in its diameter from the outside inward once. An inflow conduit 16 extending transversely to the longitudinal axis of the receptacle 12 discharges into the wall region of the bore having the larger diameter, and an outflow conduit 18 oriented coaxially to the longitudinal axis of the receptacle 12 discharges outward in the region of the bottom of the receptacle. It is assumed that the inflow conduit 16 communicates with a hydraulic pressure generator (not shown) and that the outflow conduit 18 communicates with, among other elements, a master cylinder (also not shown) of the electronically regulatable vehicle brake system. These connections are realized in the form of pressure fluid conduits embodied in the hydraulic block 10. Aside from this, for the function of the damping unit 14 it is not necessarily required that this unit have pressure fluid flowing through it or in other words that it have a separate inflow conduit and a separate outflow conduit. On the contrary, it would be equally conceivable to provide only a single hydraulic connection.

The damping unit 14 of FIG. 1 has a housing 20 composed of two components, namely a tubular hollow body 22 and a cup-shaped element 24, into which the hollow body 22 is inserted by its first end, so that the cup-shaped element 24 essentially closes the face-end opening of the hollow body. Both the cup-shaped element 24 and the hollow body 22 are made from metal and are firmly joined to one another toward the outside by positive engagement, preferably by means of a laser welded bond 26. The cup-shaped element 24 has a radial opening, in the wall portion between its bottom face and the end of the inserted portion of the hollow body 22, that forms the inlet 28 into the interior of the housing 20. This inlet 28 discharges into an annular chamber 30 that results from the stepped embodiment of the receptacle 12 and is defined by the walls of the receptacle 12 and of the cup-shaped element 24. The inflow conduit 16 that communicates with the hydraulic pressure generator also discharges into this annular chamber 30.

The annular chamber 30 is closed in the axial direction on one end by a one-piece fastening device 32 embodied on the end of the cup-shaped element 24. This fastening device 32 has a cutting edge 34 disposed on the outer end and protruding radially, whose outer diameter is greater than the diameter of the receptacle 12; the fastening device also has two annular ribs 36 spaced apart axially from one another in the direction of the bottom face of the cup-shaped element 24 and adapted to the diameter of the receptacle 12, and also has grooves 38 open at their circumference that are embodied between the annular ribs 36 and the cutting edge 34. For anchoring the damping unit 14 to the hydraulic block 10, the cup-shaped element 24 is press-fitted into the receptacle 12; in the process, the cutting edge 34 positively displaces material from the wall of the receptacle 12 into the grooves 38, thus making a positive-engagement and simultaneously fluid-tight connection between the damping unit 14 and the hydraulic block 10. Such connections are known as self-clinching connections, but instead of the connection described, still other pressure-tight connections would be conceivable, such as threaded, welded, press-fitted, or clamped connections.

On the side of the cup-shaped element 24 opposite this fastening device 32, a second sealing cross section 40 is integrally embodied. Its outer diameter is adapted to the smaller-diameter part of the receptacle 12 and thus averts a hydraulic short circuit between the inflow conduit 16 and the outflow conduit 18. In addition, the cup-shaped element 24 has a throttle device 42, in the form of a throttle bore 43 disposed eccentrically in the region of its bottom face; the throttle bore 43 has a ratio of length to diameter of at least 2.0. The longitudinal axis of this throttle bore 43 extends parallel to the outflow conduit 18 into which this throttle bore 43 discharges. It is understood that as an alternative, a plurality of such throttle bores 43 could be provided on the cup-shaped element 24 and jointly discharge into the outflow conduit 18.

The second end of the hollow body 22, opposite the cup-shaped element 24, not shown in FIG. 1, is also closed; the closure part required for this can selectively be embodied separately or in one piece with the hollow body 22. The housing 20 of the damping unit 14 thus defines a damping chamber 44 in its interior. In the damping chamber, in an installation chamber 46 between the end of the hollow body 22 and the bottom face of the cup-shaped element 24, a filter 48 is inserted. The hollow body 22 is retracted on its end located in the interior of the cup-shaped element 24; this retraction 50 forms a stop that guarantees the axial position of the filter 48.

The filter 48 comprises a filter holder 52, preferably made of plastic by injection molding, which is embodied in the form of a ring and has a plurality of radial openings 54 separated from one another by ribs. The radial openings are covered by a filter cloth 49, which for the sake of simplicity is shown only symbolically in the drawing, and which is advantageously spray-coated with plastic material in its peripheral region in the course of production of the filter holder 52. On both ends, seals 56 protruding from the circumference are formed onto the filter holder. Moreover, on at least one end toward the bottom face of the cup-shaped element 24, the filter 48 has at least one axial protrusion 58, which keeps the filter 48 spaced apart from the bottom face. The size of the protrusion 58 is selected such that the two seals 56 of the filter holder 52 are located one on either side of the inlet 28 in the wall of the cup-shaped element 24. In operative connection with the retraction 50 of the hollow body 22, this assures the pressure fluid flowing to the damping unit 14 is cleaned of contaminants by means of the filter cloth 49 before the pressure fluid exits through the throttle bore 43. This counteracts plugging up of the throttle bore 43.

Figure 2:
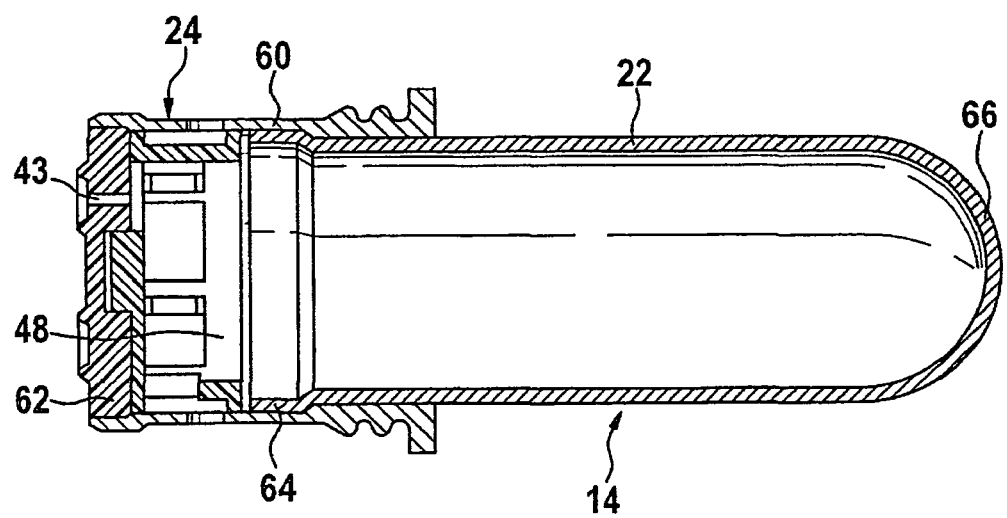
FIGS. 2–7 are fragmentary views, again in longitudinal section, showing further embodiments of the invention.

FIG. 2 shows a second exemplary embodiment of a damping unit 14, which differs from the first exemplary embodiment described above in conjunction with FIG. 1 in that the element 24 is embodied in multiple parts. The element 24 comprises both the tubular body 60 that is open on both ends and a throttle plate 62. The hollow body 22 is inserted into the first end of the tubular body 60, while the throttle plate 62 is anchored to the second end opposite it and for example has a single, eccentrically disposed throttle bore 43. The tubular body 60 is offset twice in its inside diameter; the hollow body 22 is secured in the innermost portion having the smallest diameter, while the throttle plate 62 is secured in the largest-diameter portion. The hollow body 22 protrudes axially compared to the first, smallest-diameter portion and is widened mechanically at this protruding shoulder. This widened portion 64 is produced, after the hollow body 22 is installed and before the throttle plate 62 is installed, by introducing a suitably shaped die into the tubular body 60 which at this time is still open. An effective positive engagement between the two components is thus achieved, making the damping unit 14 proof against high pressure. After the filter 48 is placed in the region of the middle inside diameter of the tubular body 60, the throttle plate 62 is installed by press-fitting and thus closing of the damping unit 14. The filter 48 rests on its face end on the end of the hollow body 22 and on the inside of the throttle plate 62. The hollow body 22 is embodied as an inexpensive deep-drawn part with a closed first end 66 shaped in the manner of a dome. Thus not only is a separate closure part dispensed with, but a hollow body 22 that is especially tight against pressure fluid and especially pressure-resistant is created.

Figure 3:
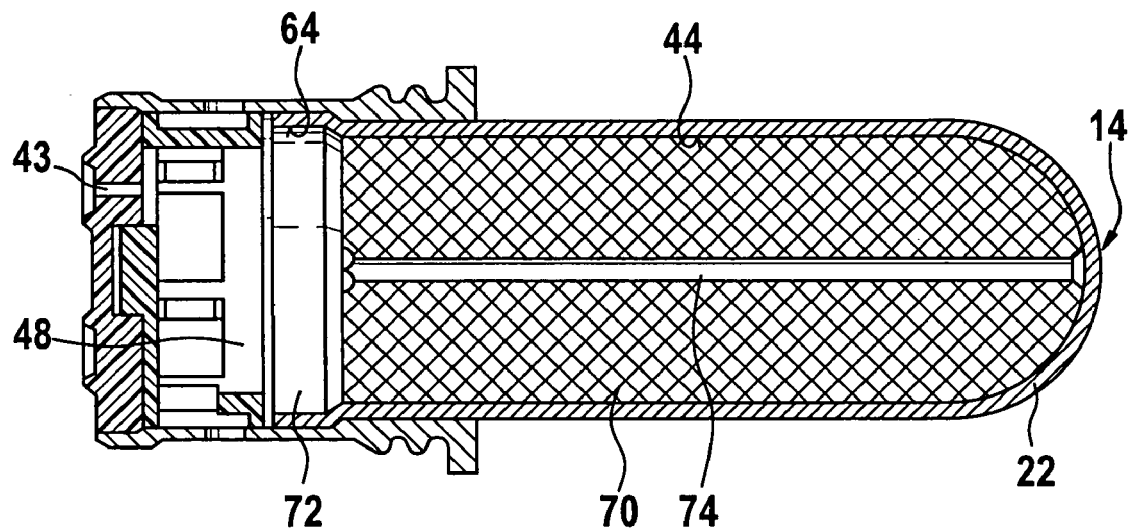

In the further exemplary embodiment of FIG. 3, an elastomer core 70 is inserted into the damping chamber 44 of the damping unit 14 and fills the damping chamber 44 completely, with the exception of a fluid volume 72 that remains between the elastomer core 70 and the filter 48. This fluid volume 72 is located at the widened portion 64 of the hollow body 22. The elastomer core 70 preferably comprises silicone rubber, which is chemically resistant to brake fluid and is mechanically resistant to the pressure and vibration loads that occur. In addition, silicone rubber has a relatively constant volumetric compressibility in the relevant temperature and frequency range over the service life involved. The attendant spring properties make it possible for the damping unit 14 with the elastomer core 70 to have a smaller volume than a comparable damping unit filled only with incompressible pressure fluid, so as to furnish the requisite elasticity in the hydraulic system for damping the pressure pulsations. In other words, by the use of an elastomer core 70, the structural volume of the damping unit 14 can be reduced and at the same time the potential risk of hollow spaces that can be flushed out only with difficulty and in which gas bubbles can collect is minimized.

Structurally, the elastomer core 70 is embodied as a solid mass, with the exception of a through opening 74 that extends concentrically to its longitudinal axis and longitudinal grooves, not visible in FIG. 3, that extend on its outer circumference parallel to the through opening 74. The purpose of the longitudinal grooves and the through opening 74 is, for the sake of better installation of the elastomer core 70, to allow the air trapped in the interior of the hollow body 22 to flow out and also to establish a pressure equilibrium at the elastomer core 70 under operating conditions, or in other words to avoid localized mechanical overloads. With respect to the remaining construction of the damping unit 14 of FIG. 3, see the description made in conjunction with FIG. 2.

Figure 4:
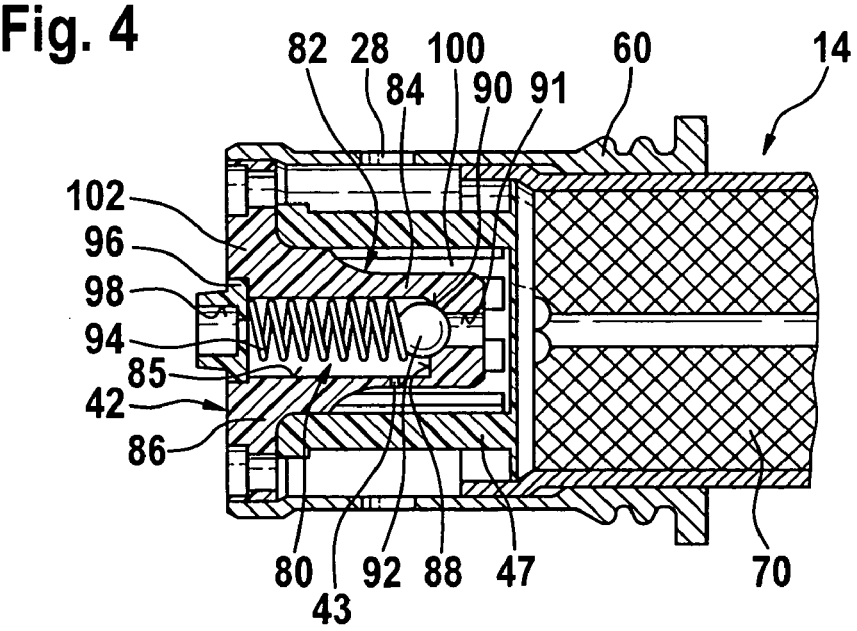

FIG. 4 shows an exemplary embodiment of the invention with a further-refined embodiment of the throttle device 42. It is distinguished in that in hydraulic terms, a pressure limiting valve 80 is connected parallel to the throttle bore 43. It is thus attained that pressure increases beyond an amount that is permissible for the sake of holding the components together and in terms of their limit of mechanical loadability are avoided. Pressure increases can occur, for instance if the throttle bore 43 becomes closed from dirt and/or in the event of low operating temperatures from the increased viscosity of the pressure fluid and can adversely effect other structural groups in a vehicle brake system, and in particular can adversely effect the functioning of the pressure generator and its drive unit. The refined throttle device 42 described below makes do in principle without an upstream filter 48. Nevertheless, in certain applications it may be useful to equip the refined throttle device 42 with such a filter 48 anyway.

In the exemplary embodiment of FIG. 4, the throttle device 42 comprises a valve body 82, which includes a valve dome 84 that protrudes into the interior of the damping unit 14 and a valve flange 86 extending all the way around and formed onto the valve dome 84. With this valve flange 86, the valve body 82 is retained in the interior of the tubular body 60 and closes off the tubular body from the outside. An annular support body 47 which surrounds the valve dome 84 is located on the inside of the valve flange 86 and is braced with its end face against the elastomer core 70. The support body is provided with continuous longitudinal slits on its circumference.

To act as the pressure limiting valve 80, the valve dome 84 has a continuous recess 85, which is eccentrically offset from the longitudinal axis of the pressure limiting valve and is stepped once on its inner end. At this step 88, a conical valve seat 90 defines an opening cross section 91, which is closed by a valve member 92 in the form of a ball. To that end, a spring element 94, disposed concentrically to the longitudinal axis of the recess 85 and braced on a stopper 96 press-fitted into the recess, acts on the valve member 92. The stopper 96 has an opening 98, so that pressure fluid, which flows through the recess 85 when the valve seat 90 is open, can flow out. By way of the design of the spring element 94, the pressure threshold at which the pressure limiting valve 80 opens counter to the force of the spring element 94 can be determined.

As already explained, this pressure limiting valve 80 is connected parallel to the throttle bore 43, and this bore, in the present exemplary embodiment, is located for instance on the circumferential surface of the valve dome 84 and discharges radially into the chamber formed by the recess 85. An inflow to the throttle bore 43 is effected through the inlet 28 in the tubular body 60 and an annular gap 100 that exists between the outer circumference of the valve dome 84 and the inner circumference of the support body 47; this annular gap 100 is axially defined by a widening 102 of the diameter of the valve dome 84 in the region of the valve flange 86. It is understood that in this exemplary embodiment as well, a plurality of such throttles 43 may be provided to adapt the throttle device 42 described to a given use. The throttle bores 43 need not necessarily be disposed in the region of the valve dome 84; instead, they can for instance be disposed in the region of the valve flange 86, or on the end face of the valve dome 84 that has the valve seat 90.

Figure 5:
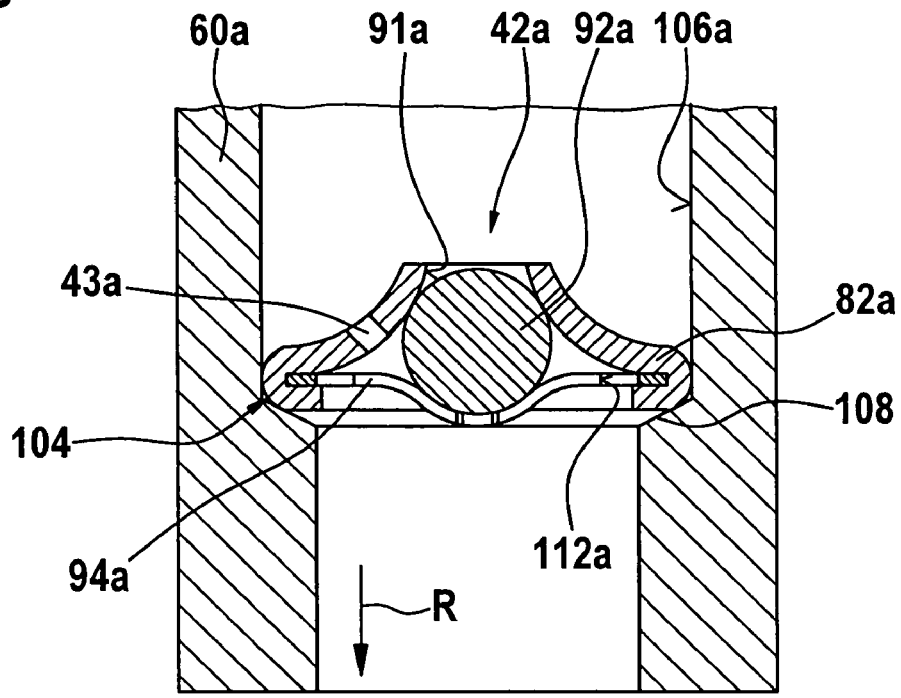

FIG. 5 shows a further exemplary embodiment of a throttle device 42a. The valve body 82a of this exemplary embodiment is preferably embodied as a funnel-shaped deep-drawn part and accordingly has a first end that is retracted in its outer diameter and defines an opening cross section 91a and a second end, of larger outer diameter, that is defined by an encompassing crimped edge 104. On the circumference, in the region of this second end, this valve body 82a is retained in a stepped bore 106a of the tubular body 60a and on its face end rests on a shoulder 108, sloping conically inward for instance, of this stepped bore 106a. By means of the crimped edge 104, a spring element 94a with through recesses 112a in its base is secured to the second end of the valve body 82a. The spring element 94a is embodied as a slit leaf spring, which in the region of its center has a spherically curved receptacle for a valve member 92a in the form of a ball. The spring element 94a is prestressed and as a result presses the valve member 92a elastically against the opening cross section 91a. In the case of a pressure increase in the space upstream of the opening cross section 91a, a pressure force acts in one direction on the valve member 92a and counteracts the force of the spring element 94a. As a result, because of this design, beyond a certain pressure level the spring element 94a progressively opens the opening cross section 91a, so that a pressure reduction occurs. In this exemplary embodiment, the throttle bore 43a is embodied as a through bore in the portion of the valve body 82a that is retracted in the form of a neck.

Figure 6:
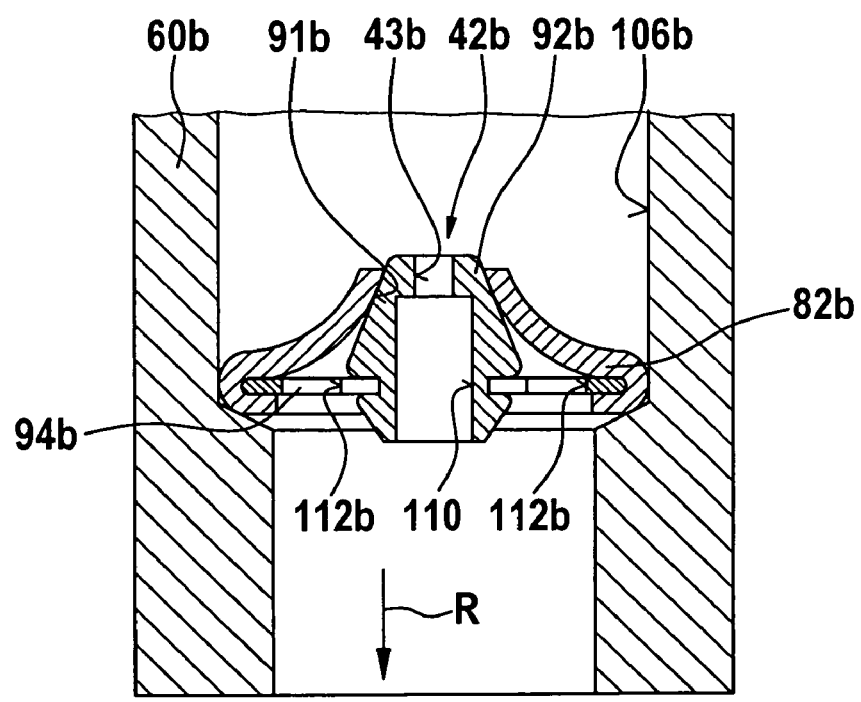

The exemplary embodiment of FIG. 6 has a throttle device 42b in a stepped bore 106b of the tubular part 60b; instead of a ball as in FIG. 5, this throttle device has a conical element as its valve member 92b, which has conical and terminal flat faces on both ends. This conical element is provided with an axially continuous longitudinal bore 110, whose first portion, toward the opening cross section 91b, forms the throttle bore 43b that changes over at a step to a second, larger-diameter portion. In this exemplary embodiment, the valve member 92b accordingly has pressure fluids flowing through it. In the region of its largest outer diameter, the conical element is connected to a spring element 94b. This spring element 94b, again embodied as a leaf spring, is fixed on its circumference to the valve body 82b and has through recesses 112b, distributed over its surface, through which recesses pressure fluid can flow out when the opening cross section 91b is open. In the state shown, the valve member 92b, acted upon by the prestressing of the spring element 94b, seals off the opening cross section 91b of the spring element. The tubular body 60b and the valve body 82b, except for the throttle bore 43b embodied on the valve member 92b, are embodied identically to that of the exemplary embodiment of FIG. 5.

Figure 7:
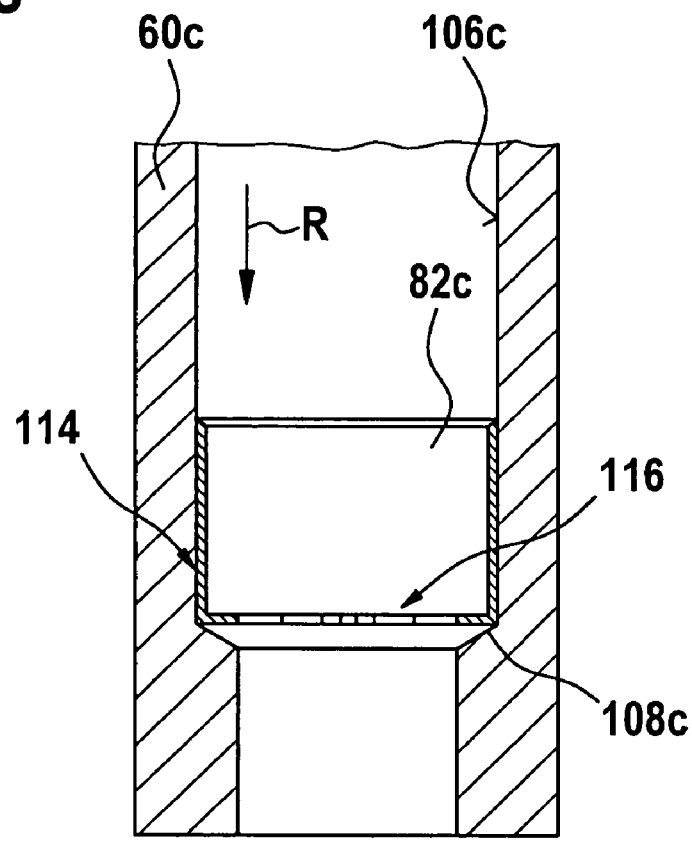
Figure 8:
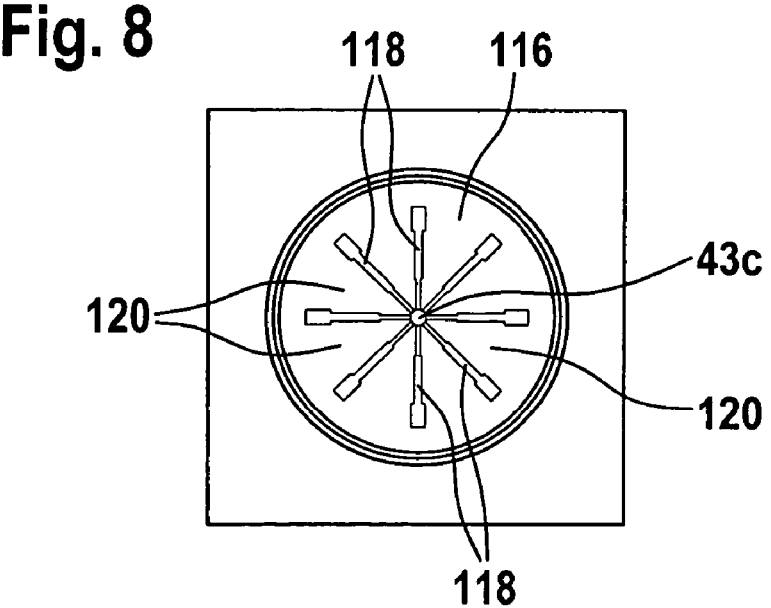
FIG. 8 shows the subject of FIG. 7 in plan view.

In the further exemplary embodiment shown in FIG. 7, no separate valve member is provided. The valve body 82c is embodied as a deep-drawn part made of a material with spring-elastic properties, such as spring steel, and is cup-shaped. Accordingly, it has an encompassing wall 114, with which it is held in a stepped bore 106c of a tubular body 60c until it meets the shoulder 108c. The bottom face 116 shown in FIG. 8 for the valve body 82c spans the cross section of this stepped bore 106c, and a centrally placed through opening in this bottom face 116 forms the throttle bore 43c. Slits 118 extend in a star pattern radially away from this through opening, so that the regions of the bottom face located between these slits 118 form elastically deformable spring tongues 120. Subjecting the spring tongues 120 to pressure causes the bottom face 116 of the valve body 82c in FIG. 7 to bulge downward, thus enlarging the through opening 43b and hence reducing the pressure level. In FIGS. 5–7, the flow direction of a pressure fluid is indicated by the directional arrow R.

It should be noted that the individual characteristics explained in conjunction with the various exemplary embodiments are not bound to those exemplary embodiments; it is understood instead that individual characteristics, or several of them, may be combined with one another without the resultant variants departing from the fundamental concept of the invention. This fundamental concept is considered to be combining the throttle device 42 and the housing 20 into a damping unit 14 that can be preassembled externally and can be checked for tightness, for instance, and anchoring this damping unit 14 in a receptacle 12 of a hydraulic block 10 of an electronically regulatable vehicle brake system by means of a relatively simple work step that can be performed economically.

The foregoing relates to preferred exemplary embodiments of the invention, it being understood that other variants and embodiments thereof are possible within the spirit and scope of the invention, the latter being defined by the appended claims.

We claim:

1. In a device for damping pressure pulsations in electronically regulatable vehicle brake systems, comprising a housing (20) enclosing a damping chamber (44), at least one hydraulic connection (16, 18) opening into the damping chamber (44), and a throttle device (42), the housing (20) and the throttle device (42) form a damping unit (14) that can be preassembled externally and is anchored in a receptacle (12) of a hydraulic block of a vehicle brake system wherein that the housing (20) of the damping unit (14) comprises a hollow body (22) that is open to at least one side and an element (24) that essentially closes the opening of the hollow body (22), and wherein this element (24), is embodied as cup-shaped, with an open first end and an essentially closed second end; and wherein the throttle device (42) is embodied in the form of at least one throttle bore (43) on the closed end of the element (24), and the hollow body (22) is inserted by its open end into the first end of the element (24).

2. The device in accordance with claim 1, wherein this element (24), on its outer circumference, has a formed-on fastening device (32) for anchoring the damping unit (14) in the receptacle (12) of a hydraulic block (10) of a vehicle brake system.

3. The device in accordance with claim 2, wherein the element (24) comprises a tubular body (60) which is open on both ends and into whose first end the hollow body (22) is inserted in portions; and wherein the throttle device (42) is embodied in the form of a throttle body (62).which is provided with at least one throttle bore (43) and is inserted into the end of the tubular body (60) opposite the hollow body (22).

4. The device in accordance with claim 1, wherein the at least one throttle bore (43) of the throttle device (42) is connected hydraulically parallel to a pressure limiting valve (80), which has an opening cross section (91, 91*a*, 91*b*) that opens as a function of the pressure prevailing upstream of the throttle bore (43).

5. The device in accordance with claim 3, wherein the at least one throttle bore (43) of the throttle device (42) is connected hydraulically parallel to a pressure limiting valve (80), which has an opening cross section (91, 91*a*, 91*b*) that opens as a function of the pressure prevailing upstream of the throttle bore (43).

6. The device in accordance with claim 4, further comprising a valve member (92, 92*a*, 92*b*) which is acted upon by a spring element (94) for controlling the opening cross section (91, 91*a*, 91*b*) of the pressure limiting valve (80).

7. The device in accordance with claim 5, further comprising a valve member (92, 92*a*, 92*b*) which is acted upon by a spring element (94) for controlling the opening cross section (91, 91*a*, 91*b*) of the pressure limiting valve (80).

8. The device in accordance with claim 1, further comprising a filter (48) upstream of the throttle device (42).

9. The device in accordance with claim 7, wherein the filter (48) is embodied as an annular filter through which pressure fluid can flow radially and which has a filter holder (52) having radial openings (54) and has at least one filter cloth (49) covering the radial openings (54).

10. The device in accordance with claim 7, wherein the filter holder (52) of the filter (48) is produced by injection molding from plastic; and wherein the filter cloth (49) is spray-coated, in the peripheral region of the radial openings, with material comprising the filter holder (52).

11. The device in accordance with claim 1, further comprising an elastomer core (70) of silicone rubber inserted into the damping chamber (44).

12. The device in accordance with claim 11, wherein the elastomer core (70) has at least one axially extending through opening (74).

13. A hydraulic block for an electronically regulatable vehicle brake system, having at least one damping unit (14) defined by claim 1.

* * * * *